(12) United States Patent
DeRosa et al.

(10) Patent No.: US 10,310,923 B1
(45) Date of Patent: Jun. 4, 2019

(54) PROBABILISTIC AGING COMMAND SORTING

(71) Applicant: Seagate Technology LLC, Cupertino, CA (US)

(72) Inventors: Jeffrey Vincent DeRosa, Burlington, MA (US); Jon David Trantham, Chanhassen, MN (US); Mark Gaertner, Vadnais Heights, MN (US)

(73) Assignee: Seagate Technology LLC, Cupertino, CA (US)

( * ) Notice: Subject to any disclaimer, the term of this patent is extended or adjusted under 35 U.S.C. 154(b) by 68 days.

(21) Appl. No.: 14/471,981

(22) Filed: Aug. 28, 2014

(51) Int. Cl.
*G06F 11/07* (2006.01)

(52) U.S. Cl.
CPC .................. *G06F 11/0757* (2013.01)

(58) Field of Classification Search
CPC ..... G06F 11/0757; G06F 13/14; G06F 13/225
See application file for complete search history.

(56) References Cited

U.S. PATENT DOCUMENTS

| | | | |
|---|---|---|---|
| 4,224,667 A | 9/1980 | Lewis | |
| 4,237,533 A | 12/1980 | Mills | |
| 4,271,468 A | 6/1981 | Christensen et al. | |
| 4,423,480 A | 12/1983 | Bauer et al. | |
| 4,458,316 A | 7/1984 | Fry et al. | |
| 5,185,737 A | 2/1993 | Nassehi et al. | |
| 5,265,252 A | 11/1993 | Rawson et al. | |
| 5,339,405 A | 8/1994 | Elko et al. | |
| 5,392,397 A | 2/1995 | Elko et al. | |
| 5,418,971 A | 5/1995 | Carlson | |
| 5,436,892 A | 7/1995 | Tago et al. | |
| 5,457,793 A | 10/1995 | Elko et al. | |
| 5,459,839 A | 10/1995 | Swarts et al. | |
| 5,509,134 A | 4/1996 | Fandrich et al. | |
| 5,530,948 A | 6/1996 | Islam | |
| 5,544,304 A | 8/1996 | Carlson et al. | |
| 5,559,988 A | 9/1996 | Durante et al. | |
| 5,646,918 A | 7/1997 | Dimitri et al. | |
| 5,664,143 A | 9/1997 | Olbrich | |
| 5,692,138 A | 11/1997 | Fandrich et al. | |
| 5,802,343 A | 9/1998 | Fandrich et al. | |
| 5,809,541 A | 9/1998 | Fandrich et al. | |
| 5,875,290 A | 2/1999 | Bartfai et al. | |

(Continued)

*Primary Examiner* — Idriss N Alrobaye
*Assistant Examiner* — Ronald T Modo
(74) *Attorney, Agent, or Firm* — Cesari & Reed, LLP; Kirk A. Cesari; Christian W. Best

(57) ABSTRACT

Systems and methods are disclosed for probabilistic aging command sorting, including adjusting an execution order for a command based on a probability of the command reaching a time out threshold. Various example embodiments are directed to selecting a command for execution from a queue of commands awaiting execution, in which the commands have non-uniform attributes influencing their selection and a time limit within which to execute them. In some embodiments, an apparatus may comprise a circuit configured to calculate a first estimated access time to execute a selected command from a command queue, modify the first estimated access time based on a probability of the selected command reaching a time-out age threshold to determine a time out-adjusted access time, and execute the selected command in an order based on the time out-adjusted access time.

24 Claims, 10 Drawing Sheets

(56) References Cited

U.S. PATENT DOCUMENTS

| | | | |
|---|---|---|---|
| 5,887,191 A | 3/1999 | Adiga et al. |
| 5,930,252 A | 7/1999 | Aaker et al. |
| 5,940,866 A | 8/1999 | Chisholm et al. |
| 5,946,466 A | 8/1999 | Adiga et al. |
| 5,956,742 A | 9/1999 | Fandrich et al. |
| 5,983,292 A | 11/1999 | Nordstrom et al. |
| 5,990,913 A | 11/1999 | Harriman et al. |
| 5,991,825 A | 11/1999 | Ng |
| 6,012,150 A | 1/2000 | Bartfai et al. |
| 6,047,334 A | 4/2000 | Langendorf et al. |
| 6,065,088 A | 5/2000 | Bronson et al. |
| 6,092,158 A | 7/2000 | Harriman et al. |
| 6,092,215 A | 7/2000 | Hodges et al. |
| 6,112,265 A | 8/2000 | Harriman et al. |
| 6,145,052 A | 11/2000 | Howe et al. |
| 6,170,022 B1 | 1/2001 | Linville et al. |
| 6,182,177 B1 | 1/2001 | Harriman |
| 6,212,611 B1 | 4/2001 | Nizar et al. |
| 6,219,750 B1 | 4/2001 | Kanamaru et al. |
| 6,226,695 B1 | 5/2001 | Kaiser et al. |
| 6,272,565 B1 | 8/2001 | Lamberts |
| 6,279,064 B1 | 8/2001 | Bronson et al. |
| 6,286,079 B1 | 9/2001 | Basham et al. |
| 6,339,801 B1 | 1/2002 | Hefferon et al. |
| 6,339,802 B1 | 1/2002 | Hefferon et al. |
| 6,345,254 B1 | 2/2002 | Lewis et al. |
| 6,345,324 B1 | 2/2002 | Baskey et al. |
| 6,401,145 B1 | 6/2002 | Baskey et al. |
| 6,427,196 B1 | 7/2002 | Adiletta et al. |
| 6,442,634 B2 | 8/2002 | Bronson et al. |
| 6,457,095 B1 | 9/2002 | Volk |
| 6,467,012 B1 | 10/2002 | Alvarez et al. |
| 6,490,644 B1 | 12/2002 | Hyde et al. |
| 6,496,877 B1 | 12/2002 | Greenberg et al. |
| 6,499,077 B1 | 12/2002 | Abramson et al. |
| 6,516,379 B1 | 2/2003 | Deshpande et al. |
| 6,567,886 B1 | 5/2003 | Saitoh et al. |
| 6,571,298 B1 | 5/2003 | Megiddo |
| 6,574,676 B1 * | 6/2003 | Megiddo | G06F 3/0601 710/5 |
| 6,591,348 B1 | 7/2003 | Deshpande |
| 6,604,178 B1 | 8/2003 | Hall |
| 6,614,709 B2 | 9/2003 | Spiegel et al. |
| 6,665,756 B2 | 12/2003 | Abramson et al. |
| 6,681,289 B2 | 1/2004 | Espeseth et al. |
| 6,684,311 B2 | 1/2004 | Fanning |
| 6,694,390 B1 | 2/2004 | Bogin et al. |
| 6,704,835 B1 | 3/2004 | Garner |
| 6,725,348 B1 | 4/2004 | Marier et al. |
| 6,728,845 B2 | 4/2004 | Adiletta et al. |
| 6,763,404 B2 | 7/2004 | Berning et al. |
| 6,774,927 B1 | 8/2004 | Cohen et al. |
| 6,779,036 B1 | 8/2004 | Deshpande |
| 6,785,793 B2 | 8/2004 | Aboulenein et al. |
| 6,848,020 B2 | 1/2005 | Hall et al. |
| 6,892,250 B2 | 5/2005 | Hoskins |
| 6,895,454 B2 | 5/2005 | Barrick |
| 6,901,461 B2 | 5/2005 | Bennett |
| 6,944,721 B2 | 9/2005 | Arimilli et al. |
| 6,963,882 B1 | 11/2005 | Elko et al. |
| 6,965,965 B2 | 11/2005 | Espeseth et al. |
| 6,973,550 B2 | 12/2005 | Rosenbluth et al. |
| 7,010,654 B2 | 3/2006 | Blackmon et al. |
| 7,013,336 B1 | 3/2006 | King |
| 7,061,714 B1 * | 6/2006 | Yu | G11B 5/5547 318/560 |
| 7,082,480 B2 | 7/2006 | Bogin et al. |
| 7,093,111 B2 | 8/2006 | Frommer et al. |
| 7,107,413 B2 | 9/2006 | Rosenbluth et al. |
| 7,127,574 B2 | 10/2006 | Rotithor et al. |
| 7,136,938 B2 | 11/2006 | Clark et al. |
| 7,143,226 B2 | 11/2006 | Fields et al. |
| 7,143,246 B2 | 11/2006 | Johns |
| 7,149,226 B2 | 12/2006 | Wolrich et al. |
| 7,177,982 B2 | 2/2007 | Barrick |
| 7,203,811 B2 | 4/2007 | King et al. |
| 7,219,273 B2 | 5/2007 | Fisher et al. |
| 7,225,326 B2 | 5/2007 | Bennett et al. |
| 7,266,650 B2 | 9/2007 | Ganfield et al. |
| 7,277,982 B2 | 10/2007 | Calvignac et al. |
| 7,289,992 B2 | 10/2007 | Walker |
| 7,296,108 B2 | 11/2007 | Beukema et al. |
| 7,296,273 B2 | 11/2007 | Kline |
| 7,305,500 B2 | 12/2007 | Adiletta et al. |
| 7,313,638 B2 | 12/2007 | Ain et al. |
| 7,321,369 B2 | 1/2008 | Wyatt et al. |
| 7,328,317 B2 | 2/2008 | Hillier et al. |
| 7,359,824 B2 | 4/2008 | Blouin et al. |
| 7,366,800 B2 | 4/2008 | Flynn |
| 7,383,464 B2 | 6/2008 | Gilbert et al. |
| 7,392,367 B2 | 6/2008 | Clark et al. |
| 7,418,540 B2 | 8/2008 | Rohit et al. |
| 7,444,435 B2 | 10/2008 | King et al. |
| 7,467,256 B2 | 12/2008 | Jain et al. |
| 7,475,202 B2 | 1/2009 | Hillier et al. |
| 7,493,456 B2 | 2/2009 | Brittain et al. |
| 7,506,084 B2 | 3/2009 | Moertl et al. |
| 7,523,228 B2 | 4/2009 | Biran et al. |
| 7,535,918 B2 | 5/2009 | Vasudevan et al. |
| 7,546,393 B2 | 6/2009 | Day et al. |
| 7,546,604 B2 | 6/2009 | Xu et al. |
| 7,613,841 B2 | 11/2009 | Asano et al. |
| 7,631,154 B2 | 12/2009 | Bellows |
| 7,644,198 B2 | 1/2010 | King et al. |
| 7,660,919 B2 | 2/2010 | Flynn |
| 7,673,111 B2 | 3/2010 | Chen et al. |
| 7,694,026 B2 | 4/2010 | Huffman |
| 7,747,788 B2 | 6/2010 | Chang et al. |
| 7,765,081 B2 | 7/2010 | Blouin et al. |
| 7,805,543 B2 | 9/2010 | Chang et al. |
| 7,827,449 B2 | 11/2010 | Gilbert et al. |
| 7,831,812 B2 | 11/2010 | Ng et al. |
| 7,870,111 B2 | 1/2011 | Walker |
| 7,870,334 B2 | 1/2011 | Zohar et al. |
| 7,895,239 B2 | 2/2011 | Wolrich et al. |
| 7,908,403 B2 | 3/2011 | Bendyk et al. |
| 7,908,443 B2 | 3/2011 | Hillier et al. |
| 7,913,034 B2 | 3/2011 | Calvignac et al. |
| 7,925,824 B2 | 4/2011 | Brittain et al. |
| 7,925,825 B2 | 4/2011 | Brittain et al. |
| 7,925,826 B2 | 4/2011 | Brittain et al. |
| 7,930,469 B2 | 4/2011 | Brittain et al. |
| 7,962,921 B2 | 6/2011 | James et al. |
| 7,996,572 B2 | 8/2011 | Blankenship et al. |
| 8,056,080 B2 | 11/2011 | Alexander et al. |
| 8,081,646 B1 | 12/2011 | Bishop et al. |
| 8,082,396 B2 | 12/2011 | Blackmon et al. |
| 8,092,288 B2 | 1/2012 | Theis |
| 8,131,921 B2 | 3/2012 | Ooi |
| 8,140,781 B2 | 3/2012 | Teh et al. |
| 8,161,234 B2 | 4/2012 | Ooi |
| 8,230,450 B2 | 7/2012 | Acedo et al. |
| 8,255,592 B2 | 8/2012 | Wang et al. |
| 8,316,179 B2 | 11/2012 | Ooi |
| 8,316,219 B2 | 11/2012 | Bellows et al. |
| 8,341,237 B2 | 12/2012 | Benhase et al. |
| 8,345,549 B2 | 1/2013 | Stephens |
| 8,352,946 B2 | 1/2013 | Srivatsa et al. |
| 8,364,863 B2 | 1/2013 | McGowan |
| 8,380,923 B2 | 2/2013 | Wolrich et al. |
| 8,392,636 B2 | 3/2013 | Fritz et al. |
| 8,423,970 B2 | 4/2013 | Pett |
| 8,447,905 B2 | 5/2013 | Ambroladze et al. |
| 8,457,777 B2 | 6/2013 | Goodman et al. |
| 8,478,968 B2 | 7/2013 | Bellows et al. |
| 8,488,960 B2 | 7/2013 | Decusatis et al. |
| 8,495,604 B2 | 7/2013 | Bellows et al. |
| 8,516,461 B2 | 8/2013 | Bellows et al. |
| 8,560,803 B2 | 10/2013 | Orf et al. |
| 8,566,532 B2 | 10/2013 | Berger et al. |
| 8,572,622 B2 | 10/2013 | Alexander et al. |
| 8,606,992 B2 | 12/2013 | Ooi |
| 8,607,003 B2 | 12/2013 | Bland et al. |
| 8,635,384 B2 | 1/2014 | Wang et al. |

(56) References Cited

U.S. PATENT DOCUMENTS

| | | |
|---|---|---|
| 8,677,031 B2 | 3/2014 | Tamir et al. |
| 8,706,970 B2 | 4/2014 | Orf et al. |
| 8,719,843 B2 | 5/2014 | Tamir |
| 2003/0182499 A1* | 9/2003 | Espeseth ............... G06F 3/0611 711/112 |
| 2009/0077233 A1* | 3/2009 | Kurebayashi ......... G06F 9/4843 709/224 |
| 2010/0011149 A1* | 1/2010 | Molaro ................. G06F 3/0613 711/103 |
| 2015/0100617 A1* | 4/2015 | Diederich ........... H04L 67/1097 709/201 |

* cited by examiner

PROBABILISTIC AGING COMMAND SORTING

SUMMARY

In certain embodiments, an apparatus may comprise a circuit configured to determine a first access time to execute a selected command from a command queue, determine a probability of the selected command reaching a time-out threshold, determine an adjusted access time by modifying the first access time based on the probability, and execute the selected command based on the adjusted access time.

In certain embodiments, a method may comprise selecting a command from a queue of a storage device for execution, including determining a first access time to execute a selected command from the queue, determining a probability of the selected command reaching a time-out threshold, determine an adjusted access time by modifying the first access time based on the probability, and executing the selected command based on the adjusted access time.

In certain embodiments, an apparatus may comprise a processor configured to determine a probability of the command reaching a time limit for executing the command, determine a probability-adjusted access time for the command based on an attribute of the command and the probability, and execute the command based on the probability-adjusted access time.

DETAILED DESCRIPTION

Figure 1:
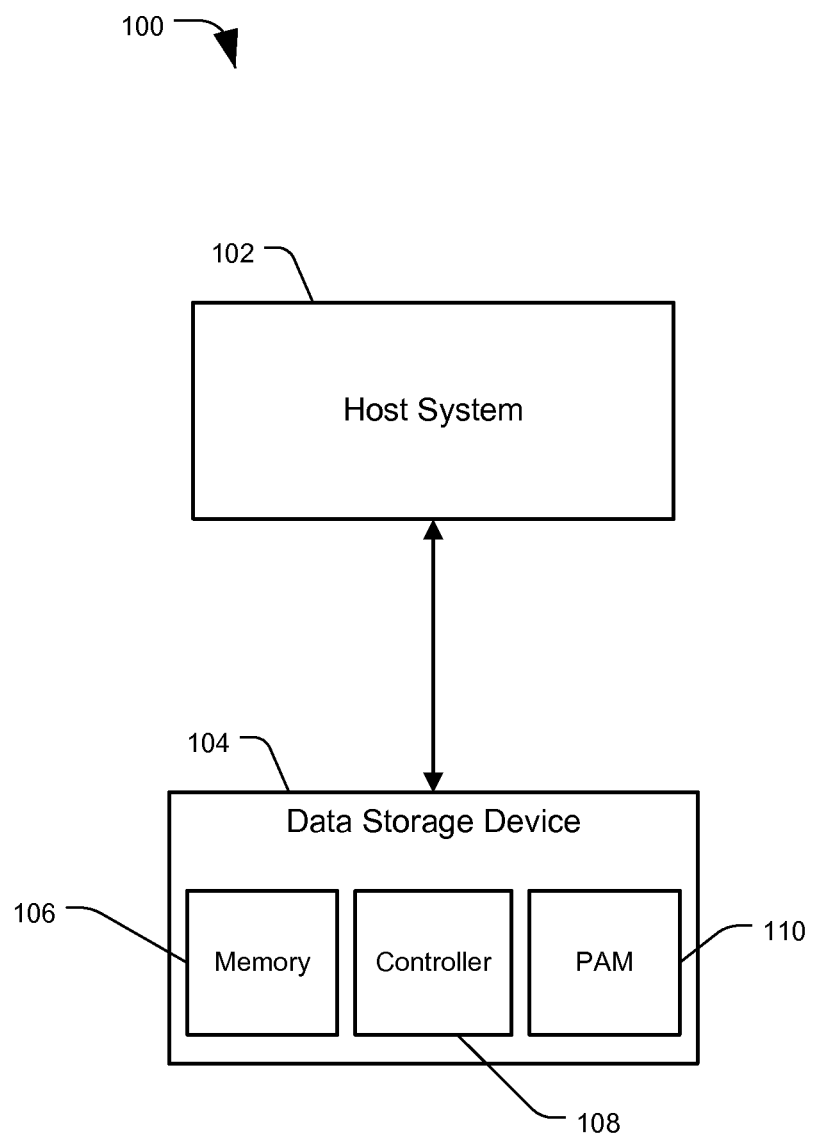
FIG. 1 is a diagram of a system employing probabilistic aging command sorting, in accordance with certain embodiments of the present disclosure.

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that, when executed, cause a processor to perform the methods.

In computing devices, queueing may be used to store commands or tasks for subsequent execution. Various service disciplines can be used with selecting a command from the queue for servicing, for example, first-in-first-out, last-in-first-out, shortest processing time, and shortest access time to name a few. In queueing environments where the factors affecting the selection of the next command for execution are non-uniform, for example where some aspect of the commands may favor the selection of one command in preference to another, it is possible for an unfortunate command to linger in the queue awaiting execution. This lingering may be referred to as "starvation". To prevent commands from starving, time limits may be imposed. These time limits can impose a deadline beyond which the command must be serviced. However, the disruption of executing a command that has met its time limit at that instant may reduce the overall performance of the system. Selecting the command at some earlier time, prior to meeting its time limit, may result in a smaller disruption and optimization of the overall performance of the system.

The problem of disruptive servicing may be readily apparent in the context of a hard disc drive. In a disc drive, read and write command requests may be sent by a host computer to the drive, where they may be queued while they await execution. The data associated with a disc drive command can have locational attributes, such as its rotational offset and track position (e.g. radius). In selecting the next command to execute after the currently executing command is completed, a disc drive might calculate the access time for all of the commands in the queue from the end of the currently-executing command and select the command with the shortest access time from the ending position of the current command. For example, U.S. Pat. No. 6,445,531 by Gaertner et al., the disclosure of which is incorporated herein by reference, describes one such method of selection.

As discussed above, in computing devices such as disc drives commands may have a time limit within which they are to be executed. If a command is not executed within the time limit, it may "time out" or become "stale," which may result in the device which issued the command to consider the command lost or failed. In some embodiments, a device may be configured to immediately service a command that has timed out. This may be negatively disruptive to the overall performance of the device. For example, consider the case where a disc drive's actuator is at the outer edge of the disc and the command timing out is at the inner edge of the disc. The drive may need to seek the actuator across the entire surface of the disk to service the command. Thus, if a command reaches this time-out limit it can lower overall performance of a device as, for example, the command is not timely executed, other commands are delayed, the command must be re-submitted, etc. The problem may be especially exacerbated in certain workloads. For example, disc drive workloads especially prone to timeouts may include those with a high command queue depth, low time-out limits, data block emulated (e.g. 5XXE) read-modify-write workloads, priority queueing, other workloads, or any combination thereof.

More generally, commands reaching a time-out limit can arise in any devices or systems employing a command queue, where multiple pending commands are collected for execution. Commands in a command queue may be sorted, for example according to an efficient processing order, selected one-at-a-time for execution in a most efficient manner, or otherwise optimized for performance. Command queues may improve overall performance (e.g. input/output (I/O) rate) by executing operations in an intelligent order. However, certain operations may not integrate with other pending operations, may be spatially distant from other operation locations, may have a low priority, or otherwise have a reduced chance of selection for activation, and may therefore be pushed up the queue, or "put off" until they time-out. An example of a system employing command queuing can be seen in FIG. 1.

FIG. 1 is a diagram of a system 100 employing probabilistic aging command sorting, in accordance with certain embodiments of the present disclosure. The system 100 may include a host 102 and a data storage device (DSD) 104. The host 102 may also be referred to as the host system or host computer. The host 102 can generally be any device that utilizes a data storage device, for example, a desktop computer, a laptop computer, a server, a tablet computer, a telephone, a photocopier, a music player, another electronic device, or any combination thereof. Similarly, the DSD 104 may be any of the above-listed devices, or any other device which may be used to store or retrieve data, such as a solid-state drive (SSD), a hard disk drive (HDD) or hybrid hard-drive (HHD). The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive).

The DSD 104 may include a memory 106 and a controller 108. The memory 106 may comprise magnetic storage media such as disc drives, nonvolatile solid state memories such as Flash memory, RAM, ROM, other types of memory, or a combination thereof. Memory 106 may store user data, a command queue for pending operations, other data, or a combination thereof. The controller 108 may comprise one or more circuits or processors configured to control operations of the data storage device 104, such as storing data to or retrieving data from the memory 106. The DSD 104 may receive a data read or write request, processing requests, or other requests from the host device 102, and use the controller 108 to perform operations based on the request.

In some embodiments, host 102 may send a series of input or output (I/O) commands or requests to DSD 104, such as instructions to store data to or retrieve data from memory 106. DSD 104 may place the requests into a command queue, and activate the operations based on a logical execution order. For example, memory 106 may include a disc storage medium. Data may be retrieved from or stored to the disc using a magnetic transducer head on an arm which can move across the disc surface as the disc spins. An efficient order for executing the I/O operations may include minimizing an amount of time to mechanically move the arm and spin the disc in between operations. For example, this may include grouping commands from the queue that require accessing locations on the disc that are near to each other. However, if a chosen command requires accessing a portion of the memory that is not near to the locations for other commands, execution of the chosen command may be postponed, and the command may time-out, or reach an age threshold, before the command is executed.

A time out period for commands may be specified by host 102 when issuing commands, included as part of the configurations of DSD 104, included as part of the communication protocol used to transfer commands from host 102 to DSD 104, or otherwise defined. For example, if the host 102 and DSD 104 communicate using the small computer system interface (SCSI), the command timeout period may be defined as part of the interface. The SCSI interface may have a default time-out period, or the time-out period can be modified or overridden by a device manufacturer, for example by using mode page configurations.

In some embodiments, multiple time-out periods or thresholds may be used. For example, there may be a "hard" timeout period where a host may consider a command failed if no response is received, and a shorter "soft" timeout threshold that requires a device to execute a command so that the hard timeout threshold is not reached. In some embodiments, a device may have multiple tiers of timing thresholds, or multiple age thresholds that may influence device behavior. In some embodiments, different timeout values may be applied for different types of operations, such as based on an estimated execution time. For example, read commands, write commands, cached write commands, and other operations may have different timeout age thresholds. One or more age thresholds may be based on host-supplied parameters. For example, a host may explicitly specify an age threshold for a command, or it may include information such as a priority value for commands (e.g. a numerical priority rating from 0 through 15). A device may assign a timeout threshold to each command based on a priority level for the command. Other embodiments are also possible.

In certain embodiments, a device may determine timeout values or thresholds for each command, for different groups or categories of command, or for all commands based on a variety of factors. For example, a device may select a timeout threshold based on a state of the command queue. In some embodiments, an age threshold may be set lower for a smaller queue depth (e.g. number of pending commands in the queue, as discussed below), or high for a larger queue depth. In some embodiments, the age threshold may be set based on a locality of the commands, or a breadth of a storage device LBA space to be accessed by a set of commands in the command queue. For example, the threshold may vary depending on whether the pending commands are all directed to a span of LBAs of a disc memory that includes only 1-5% of the LBA space and timeouts are unlikely, or whether the pending commands include 85% of the LBA space and timeouts are more likely. In some embodiments, the timeout threshold may vary based on transfer lengths of commands in the command queue. For example, the threshold may vary based a number of sectors to be accessed for a given command, or for a set of commands, where longer read or write operations may reduce a total number of I/O operations that can be completed in a period of time. Other embodiments are also possible.

If a command in the command queue reaches a time-out age threshold, the DSD 104 may halt the selection of other commands and service the command that has reached the age threshold. This operation may not be optimized for time or performance, and may be performed at the native unqueued I/O rate for the DSD 104. In addition, this operation may interrupt a series of efficiently organized operations in the command queue, costing performance efficiency for the queued commands as well. Accordingly, it may be beneficial to execute commands before they time out, at a point in the queue where execution would be superior to the unqueued I/O rate. By calculating the probability of timing-out and incorporating this information into the calculation of the overall access time, it is possible to greatly reduce the performance losses due to command time-outs.

Accordingly, DSD 104 may include a probabilistic aging module (PAM) 110. The PAM 110 may be one or more processors, controllers, or other circuits, or it may be a set of software instructions that, when executed by a processing device, perform the functions of the PAM 110. In some embodiments, the PAM 110 may be part of the controller 108, or executed by the controller 108. The PAM 110 may control operations of DSD 104 relating to calculating a probability of commands timing out, and incorporating the probability into the access time calculation for command ordering.

Figure 8:
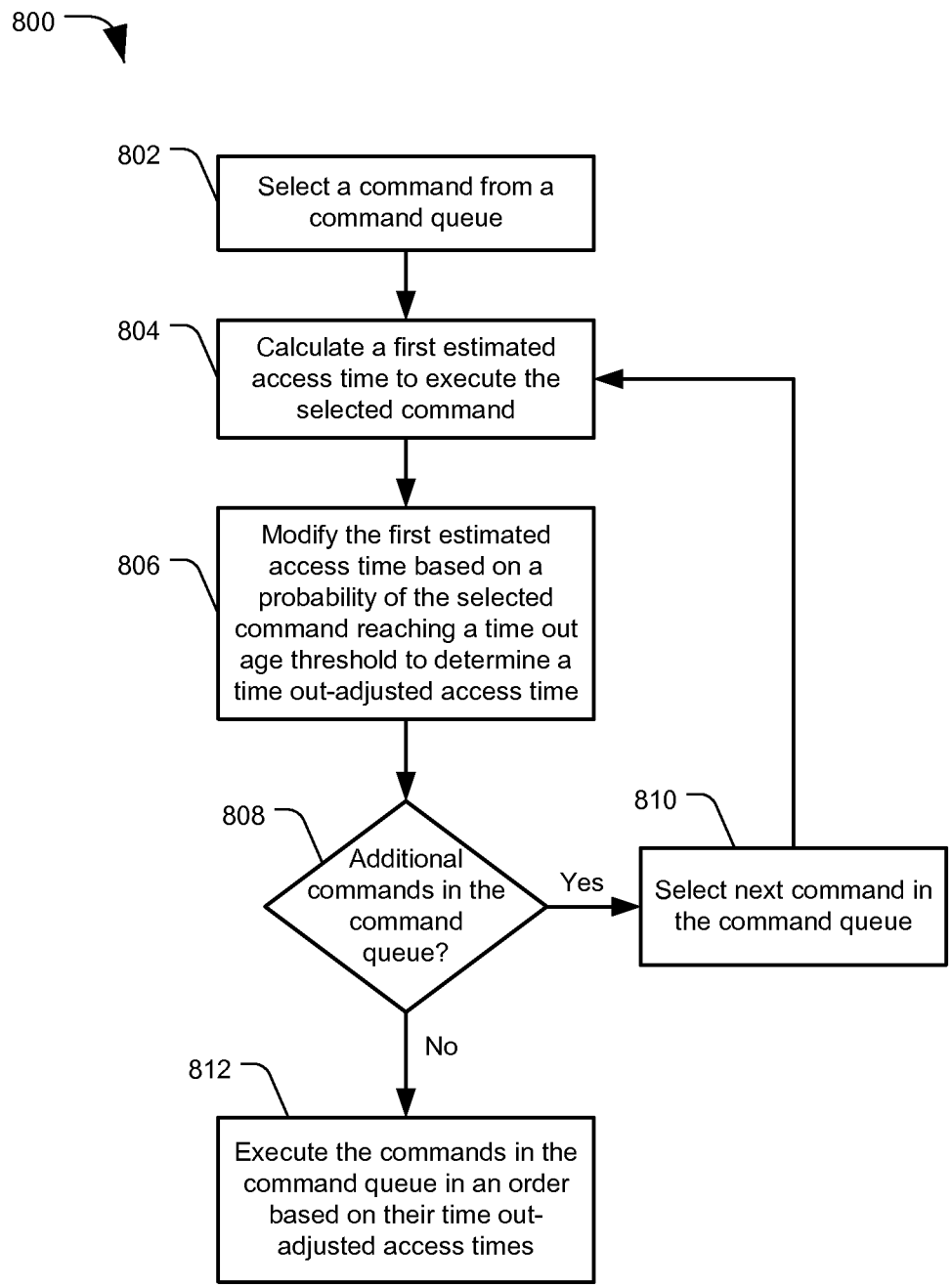
FIG. 8 is a flowchart of a method for probabilistic aging command sorting, in accordance with certain embodiments of the present disclosure.
Figure 9:
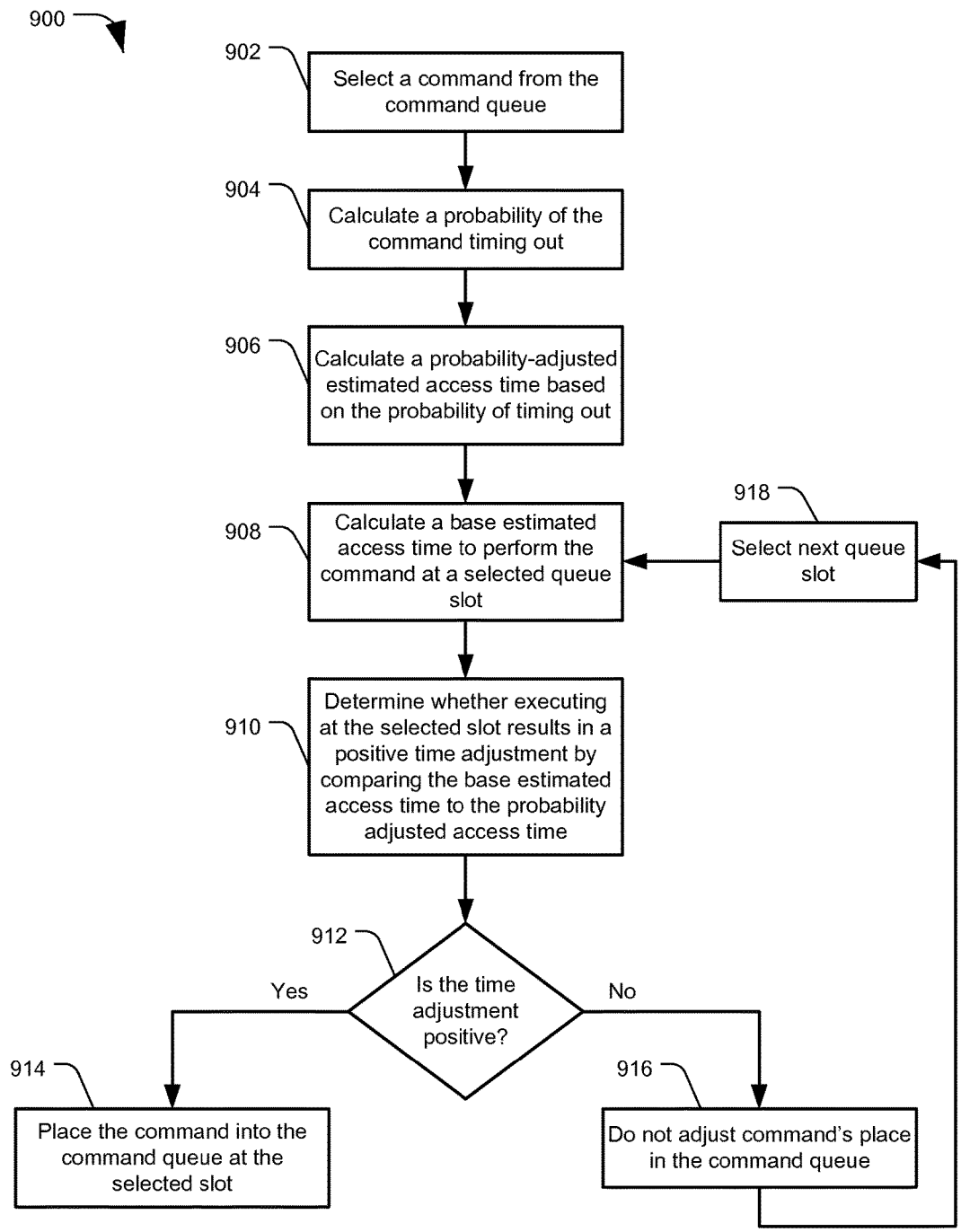
FIG. 9 is a flowchart of a method for probabilistic aging command sorting, in accordance with certain embodiments of the present disclosure.
Figure 10:
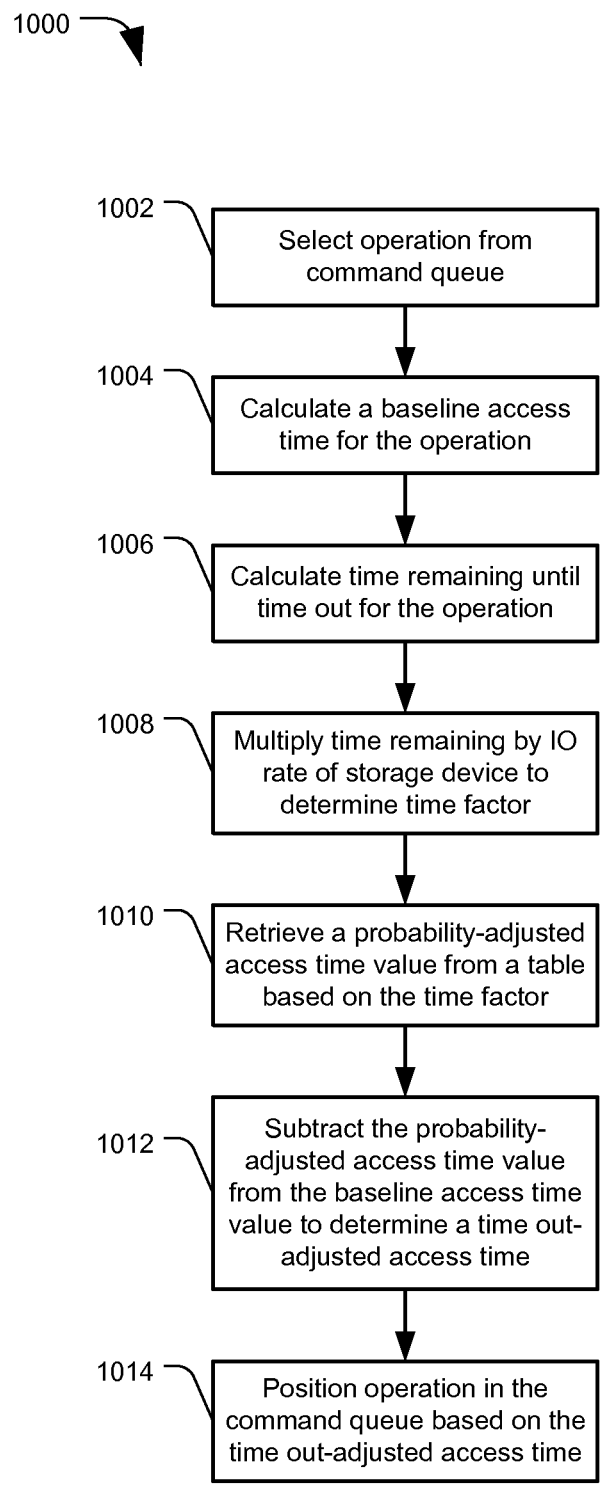
FIG. 10 is a flowchart of a method for probabilistic aging command sorting, in accordance with certain embodiments of the present disclosure.

In some embodiments, the PAM 110 may control access time adjustment for operations in the command queue based on a probability of timing out, such as by executing the methods described in relation to FIGS. 8 through 10. For example, the PAM 110 may calculate a baseline access time for an operation and adjust the access time by an adjustment function. The adjustment function may include a variety of variables, for example, the adjustment may be determined as a function of the quantity of commands in the queue, the time remaining for an operation before timeout, the average execution time of commands, transfer lengths of other functions in the queue, etc. In some embodiments, the process may be repeated for all commands in the queue, and then the command with the shortest adjusted access time may be selected for execution. In some embodiments, the PAM 110 may sort operations in the command queue based on their time out adjusted access times. Other embodiments are also possible.

Figure 2:
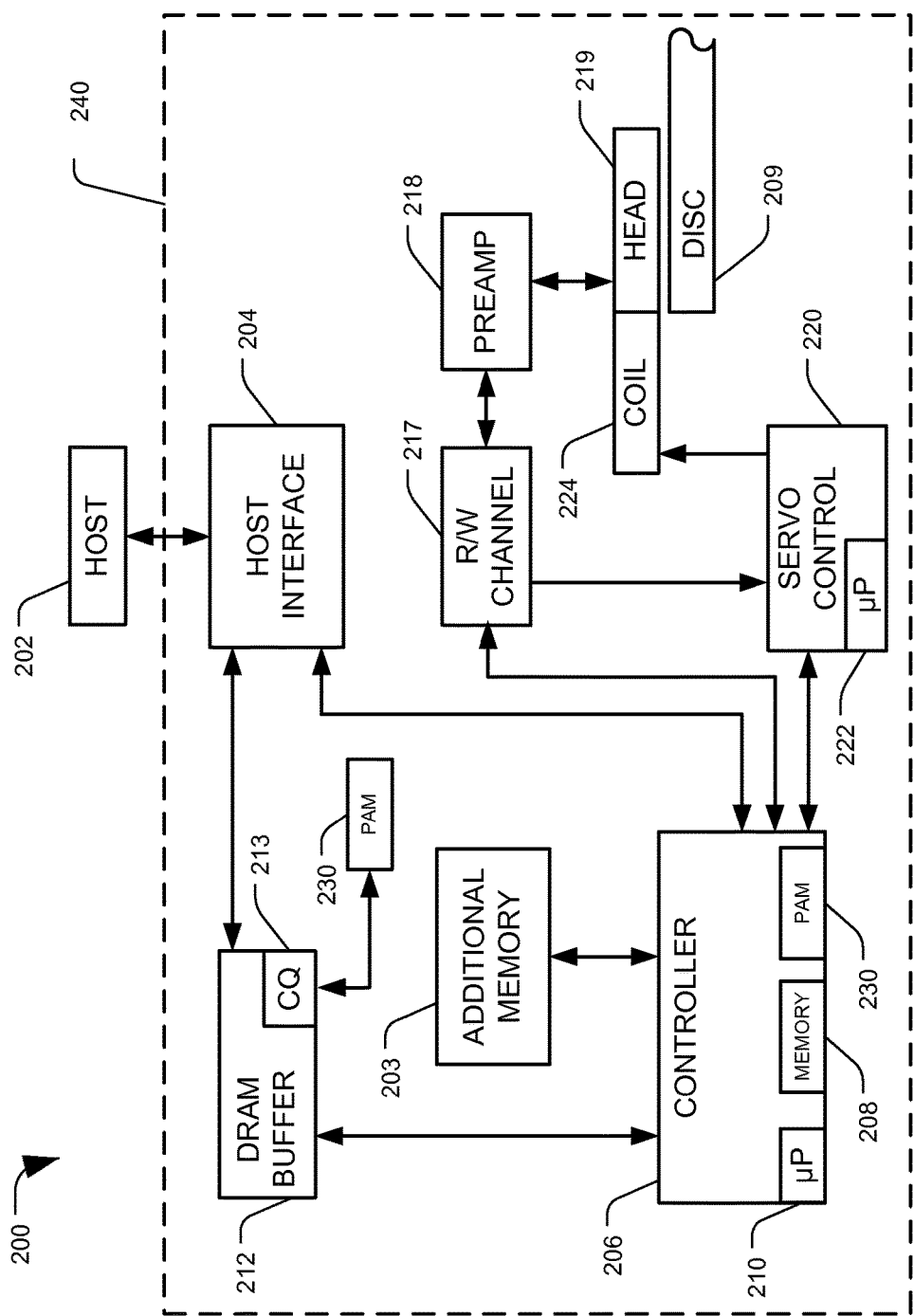
FIG. 2 is a diagram of a system employing probabilistic aging command sorting, in accordance with certain embodiments of the present disclosure.

FIG. 2 is a diagram of a system employing probabilistic aging command sorting, in accordance with certain embodiments of the present disclosure. Specifically, FIG. 2 provides a functional block diagram of an example data storage device (DSD) 200. The DSD 200 may be a data storage device such as the device 104 shown in FIG. 1. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector (not shown) that allows the DSD 200 to be physically removed from the host 202. In some embodiments, the DSD 200 may have a casing 240 housing the components of the DSD 200 or the components of the DSD 200 may be attached to the housing, or a combination thereof. The DSD 200 may communicate with the host 202 through the interface 204 over wired or wireless communication. In some embodiments, DSD 200 may be a stand-alone device that does not connect to a host. In some embodiments, interface 204 may be used to connect to a network, or DSD 200 may include a network interface (not shown) in addition to the host interface 204.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component. Commands may be organized in the CQ 213 by the controller 206, a probabilistic aging module (PAM) 230, by other components, or a combination thereof.

The DSD 200 can include a programmable controller 206, which can include associated memory 208 and processor 210. In some embodiments, the DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of readback signals. Head(s) 219 may include a read head element and a write head element (not shown). A servo control circuit 220 may use servo data to provide the appropriate current to the coil 224, sometimes called a voice coil motor (VCM), to adjust an arm (not shown) to position the head(s) 219 over a desired area of the disc(s) 209. The controller 206 can communicate with a processor 222 to move the head(s) 219 to the desired locations on the disc(s) 209 during execution of various pending commands in the command queue 213. In some embodiments, the DSD 200 can include an additional memory 203, which can be either volatile memory such as DRAM or SRAM, or non-volatile memory, such as NAND Flash memory. For example, the DSD 200 may include solid state memory instead of or in addition to disc memory. The additional memory 203 can function as a cache and store recently or frequently read or written data, or data likely to be read soon. Additional memory 203 may also function as main storage instead of or in addition to disc(s) 209. A DSD 200 containing multiple types of nonvolatile storage mediums, such as a disc(s) 209 and Flash 203, may be referred to as a hybrid storage device.

DSD 200 may include a PAM 230. The PAM 230 may be a processor, controller, or other circuit, or it may be a set of software instructions that, when executed by a processing device, perform the functions of the PAM 230. In some embodiments, the PAM 230 may be part of the controller 108, or executed by the controller 206. In some embodiments, the PAM 110 may control access time adjustment for operations in the CQ 213 based on a probability of timing out, such as by executing the methods described in relation to FIGS. 1 and 8.

Figure 3:
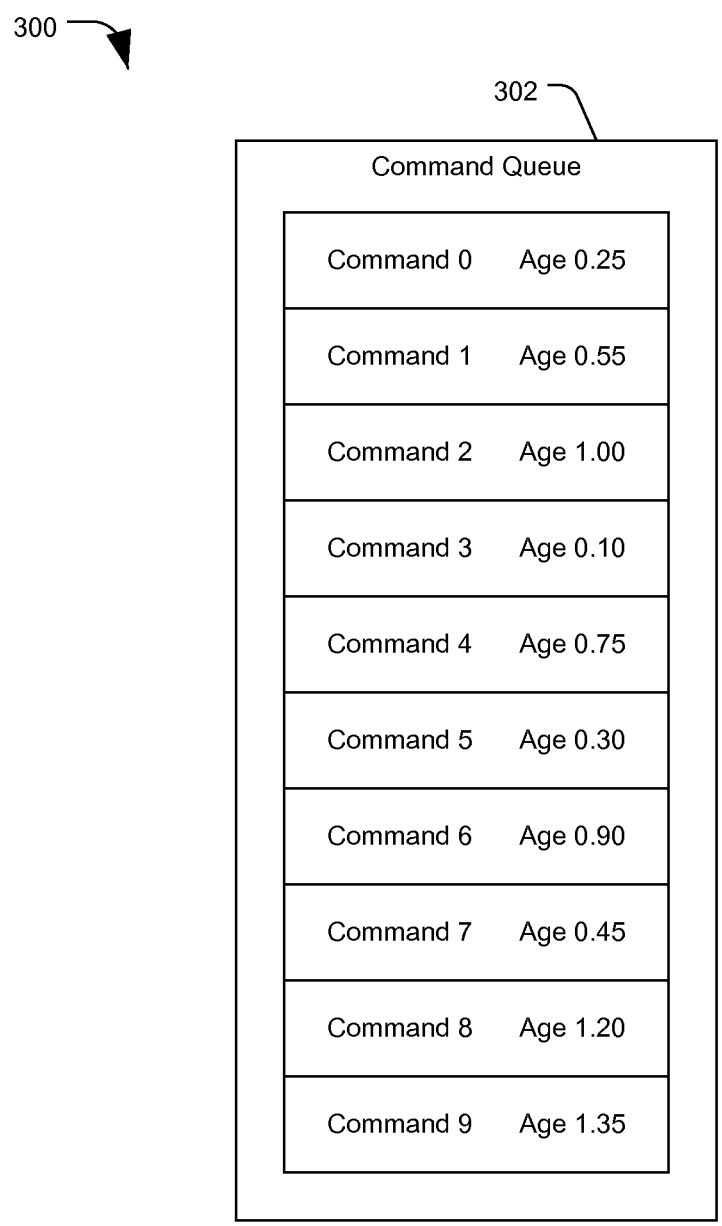
FIG. 3 is a diagram of a system employing probabilistic aging command sorting, in accordance with certain embodiments of the present disclosure.

FIG. 3 is a diagram 300 of a system employing probabilistic aging command sorting, in accordance with certain embodiments of the present disclosure. The diagram 300 includes a command queue (CQ) 302, such as may be maintained by a data storage device to store and organize pending commands. CQ 302 contains ten pending operations, ordered as command 0 through command 9. The number of pending commands may be referred to as the queue depth of a command queue; in this example embodiment, CQ 302 has a queue depth of ten. The commands in a command queue may have one or more non-uniform attributes which can influence the selection of which command to execute next, or for a selected execution order of the commands. For example, each command may have one or more target sectors corresponding to transducer head and disc locations, which may influence an access time for that command. Other attributes may include priority levels, transfer times, whether requested data exists in a cache, or other attributes.

In addition, a system employing a probabilistic aging algorithm may track an age for each command in queue, as shown in FIG. 3. A device may store the actual age value, a number of clock ticks since receipt, a timestamp of when the command was received from which the age can be calculated as needed, or the age may be monitored by other methods. In diagram 300, the age is shown for each command in terms of seconds since the command was received. Although the commands in the queue of FIG. 3 are shown as tightly packed and ordered, they may be sparsely arranged or, more generally, may be organized in any logical fashion suitable for the circuitry of the data storage device.

In addition, commands may have a designated time-out age threshold, for example 1.5 seconds, although longer or shorter time out periods may be used. If a command reaches the time out threshold without being executed, the command may expire, or it may be executed immediately regardless of its position in the CQ 302. Assuming commands are queued such that commands with a lower command number are executed earliest, FIG. 3 depicts an example in which the last command in the queue, command 9, may be approaching the 1.5 second time-out age threshold with an age of 1.35 seconds. A device may calculate a probability of a command timing out, and factor that probability into an algorithm for organizing pending operations. For example, a probability of a command timing out may be weighed against a performance loss (e.g. based on an IO rate of executing queued vs. unqueued commands) to determine when to execute the command.

A device may calculate a probability of timing out, and an effect on performance, using a number of calculations and approximations. In some embodiments, performance calculations or estimates may be performed outside the device, for example by a manufacturer or other party. For example, some values and estimates may be pre-loaded on a device, or updated in the device firmware with a software update. This may save processing time at the device and improve performance.

An example process of calculating a probability of timing out is provided herein. At an example queue depth of 64 commands, the odds of a command not being picked for activation may be approximately 63 out of 64, since only one command may be activated at a time. The odds of this happening two times in a row is may be (63/64). The odds of this happening 'X' times in a row may be $(63/64)^x$. The more general form of this equation may be (Equation 1):

$$\text{Probability of not being picked for activation} = ((\text{queue depth}-1)/(\text{queue depth}))^x$$

where "X" is the number of times the command is not picked for activation.

By knowing the I/O rate for a given workload and the amount of time remaining before a command will time out, it is possible to calculate the probability that a command will time out in the future. For example, at queue depth 64, suppose a given drive can perform at an approximate I/O rate of 300 I/O's per second. In some embodiments, the larger the queue depth, the most I/O's per second can be performed by a given drive, but the more time outs may occur. An approximate I/O rate for a given queue depth for a given drive can be determined during a manufacturing process, or may be determined by a drive based on performance measurements. For example, the approximate I/O rate for a selected number of queue depths may be stored on a drive, and the drive may consult a table for a nearest I/O rate approximation based on the current queue depth. In some embodiments, an I/O rate approximation for a single selected queue depth may be used to simplify the probability calculation.

If a command in the 64 depth queue has one second remaining before it times out, and the drive performs at approximately 300 I/O operations per second at 64 queue depth, this can leave approximately 300 opportunities for activation of the command: (I/Os per second*(time remaining until time out)). The number of opportunities remaining can be insterted into Equation 1 as the value of "X" to determine a probability of the command timing out. Using Equation 1, the probability of this command timing out may be:

$$\text{Probability of Time-Out} = (63/64)^{300} = 0.0089$$

Figure 4:
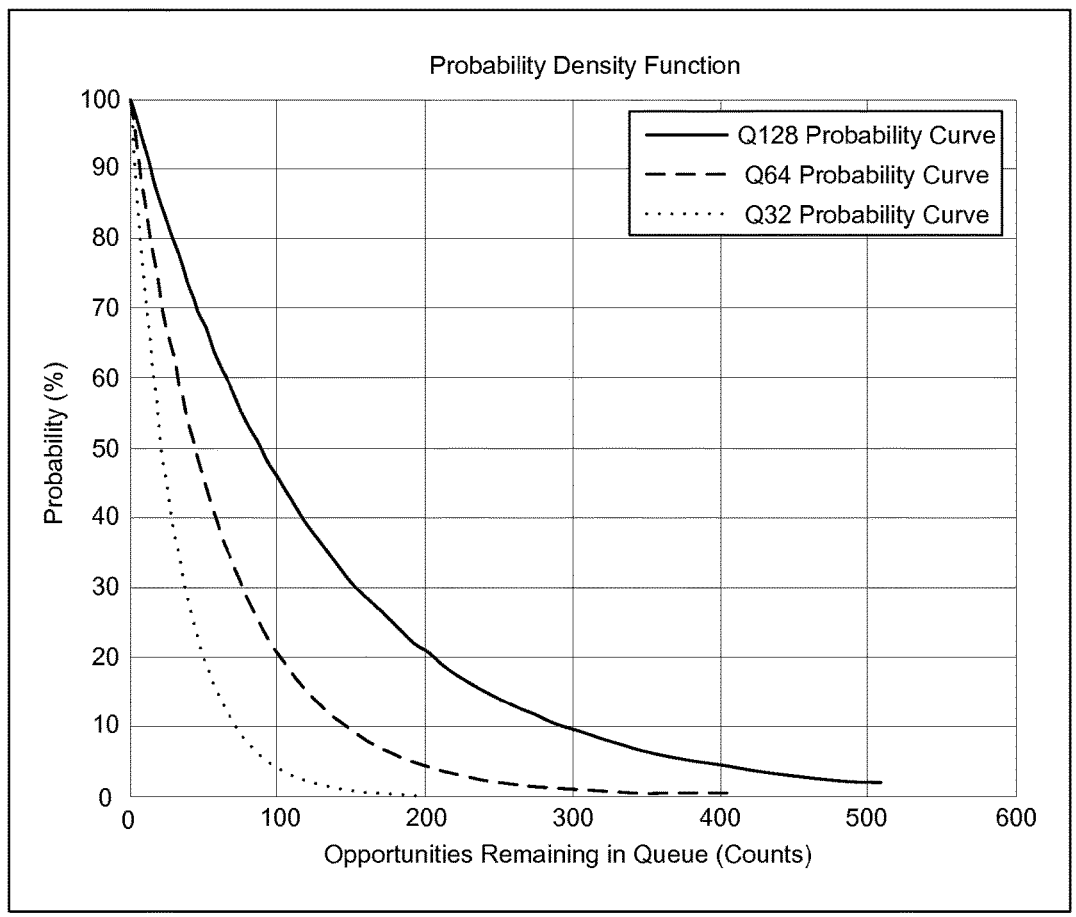
FIG. 4 is a graph of a system employing probabilistic aging command sorting, in accordance with certain embodiments of the present disclosure.

FIG. 4 is a graph 400 of a system employing probabilistic aging command sorting, in accordance with certain embodiments of the present disclosure. In particular, FIG. 4 displays Equation 1 for various example queue depths. The Y-axis, labeled "probability," represents the odds of a command timing out while waiting in the command queue. The X-axis, labeled "Opportunities Remaining in Queue (Counts)," may represent the value "X" in Equation 1. The more opportunities remaining to execute the command before it times out, the lower the odds that the command will time out. The smaller the queue, the lower the chances of a command timing out before it is executed. As shown in graph 400, the smallest example queue depth of 32 quickly approaches a negligible probability of timing out. Larger queues, such as represented by the Q128 probability curve, still have approximately 2% probability of a given command timing out, even with 500 opportunities remaining in queue.

A drive may calculate an access time for a selected command to determine approximately how long it may take for the command to begin execution after the end of the current command being executed completes. This may be considered the "base" access time. For example with a disc-based data storage device, access time may be approximately calculated as a seek time (e.g. the time it takes to move a transducer head from a starting position to a target data track) plus additional rotational latency (e.g. the time it will take for the disc to rotate so that the head is positioned over the target data sectors on the track). The access time may be calculated from a given starting disc and head position, for example based on a calculated head and disc location after executing a previous operation.

After the base access time has been calculated for a selected command, an adjustment to this value may be added based on the command's probability of timing out. Instead of or in addition to the number of I/O operations per second, I/O rates or operation times may also be expressed in terms of "wedges." A "wedge," as used herein, can refer to a fraction of a revolution of a disc storage medium. For example, a disc may have 500 "wedges" or "spokes" in a full rotation. Accordingly, requiring 500 wedges for performing unqueued IO commands may indicate that, on average, a drive spins a disc 500 wedges to complete the IO operation, while the drive may only need to spin the disc 300 wedges to execute an average IO command when running at a queue depth of 128 commands. "Wedges" may also be thought of as a measure of time, wherein an operation that takes 500 wedges to complete takes longer than an operation requiring 300 wedges. As an example conversion, if a drive operating at a 128 queue depth performs and average of 300 wedges per I/O operation, and 300 I/O operations per second, the drive may perform at an average of 90,000 wedges per second (number of wedges per I/O operation*number of I/O operations per second). Assuming that a drive has a maximum rotation speed, performing unqueued operations at a higher wedge count of 500 wedges per I/O would accordingly reduce the number of I/O operations that could be completed in a given time frame.

Figure 5:
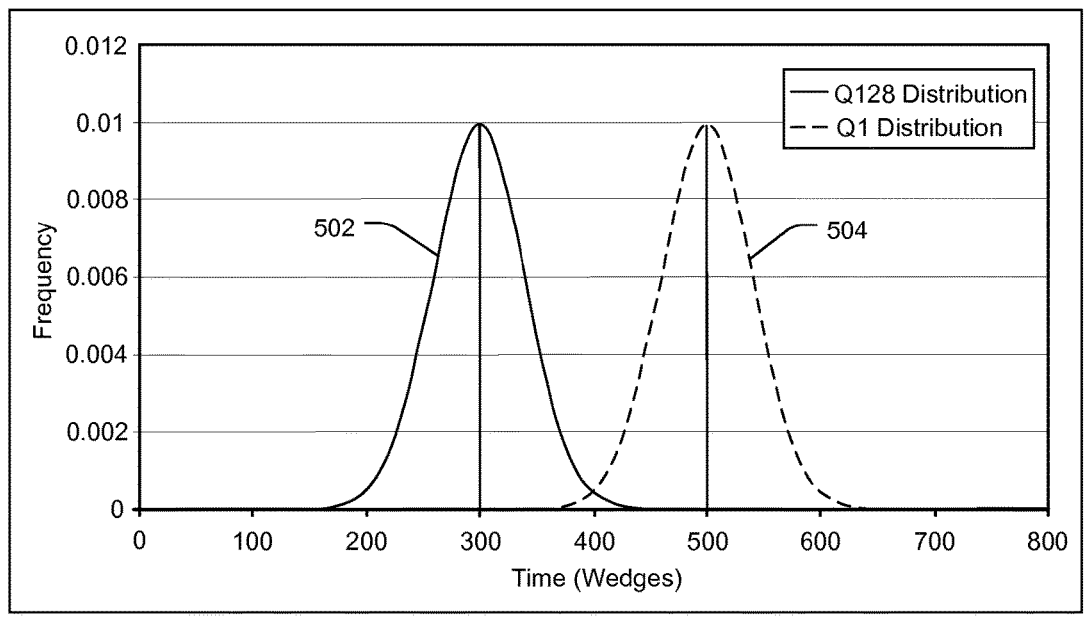
FIG. 5 is a graph of a system employing probabilistic aging command sorting, in accordance with certain embodiments of the present disclosure.

Assume that a given drive can perform at an average rate of 500 wedges per I/O when performing unqueued commands, and at an average rate of 300 wedges per I/O when operating at queue depth 128. Both I/O rates may have a distribution about the mean that is normal. FIG. 5 is a graph 500 of a system employing probabilistic aging command sorting, in accordance with certain embodiments of the present disclosure. Graph 500 depicts the normal I/O distribution rate around the mean for unqueued operations, at 504, and for operations when operating at a queue depth of 128, at 502. Also assume that for a selected command, the probability of it timing out is 50%, based on its age and the I/O rate of this workload (see Equation 1 and FIG. 4). Then the future expected access time (FEAT) for the selected command may be calculated as follows (Equation 2):

FEAT=Q128 I/O Rate+Prob*(Q1 I/O Rate−Q128 I/O Rate)

Or more specifically for the example described above,

FEAT=300+0.5*(500−300)=400 Wedges to execute the selected command

In some embodiments, the FEAT of Equation 2 may be the weighted average of the Q128 value and the Q1 value, and it may converge on the Q1 value when the probability of time out reaches 100%. The FEAT value can be used to represent the average expected access time this command will have if left in the queue, instead of being activated as the next command or re-positioned to a selected place in a queue.

Figure 6:
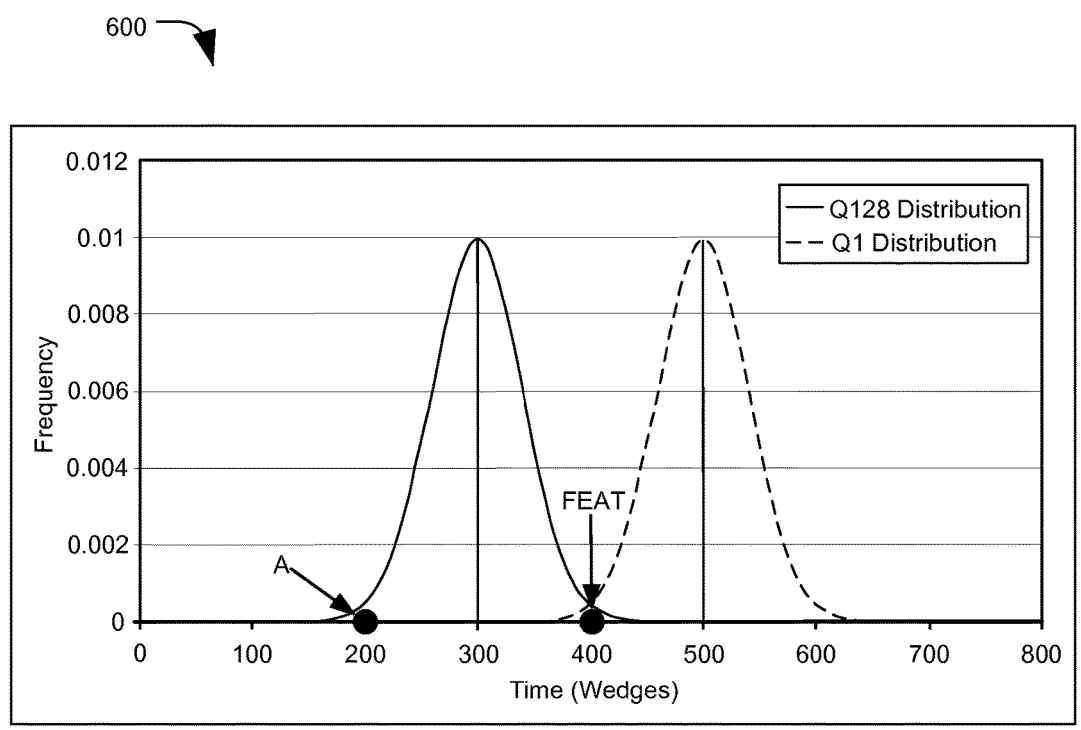
FIG. 6 is a graph of a system employing probabilistic aging command sorting, in accordance with certain embodiments of the present disclosure.

FIG. 6 is a graph 600 of a system employing probabilistic aging command sorting, in accordance with certain embodiments of the present disclosure. Graph 600 depicts an example of a selected command 'A,' according to the calculations discussed above. The calculated FEAT of 400 is indicated on the graph. This FEAT value of 400 indicates an estimated average access time if the command A is left in the queue.

Suppose an initial or "base" access time for command A in the queue of depth 128 is calculated to be 200 wedges, as shown on graph 600. For example, this initial or base access time, as described above, may be calculated as seek time+rotational latency. The base access time may be calculated for a current head and disc position, or for an anticipated head and disc position after executing another given command. The base access time of 200 wedges may be a very fast access time relative to the Q128 distribution, and may be well above the FEAT calculated above. Relative benefit or detriment of activating the selected command may be calculated, for example, as:

FEAT—base access time

In this case, the relative benefit or detriment may be calculated as 400−200=200. So in general, activating command A at the calculated position would represent a relative benefit of 200 wedges compared to leaving the command at its current queue position. For example, in systems that calculate which command to execute next from all commands in a queue, the system may choose to execute command A next rather than leaving it in the queue for execution later, depending on calculated values of other queued commands. In some embodiments, a device may compare the FEAT to the base access time to determine whether to activate the command now or to place it in a corresponding command queue slot. If the comparison is positive, it may indicate that the command should be placed into the tested slot; if the comparison is negative, it may indicate that the command should not be relocated to the tested slot.

Figure 7:
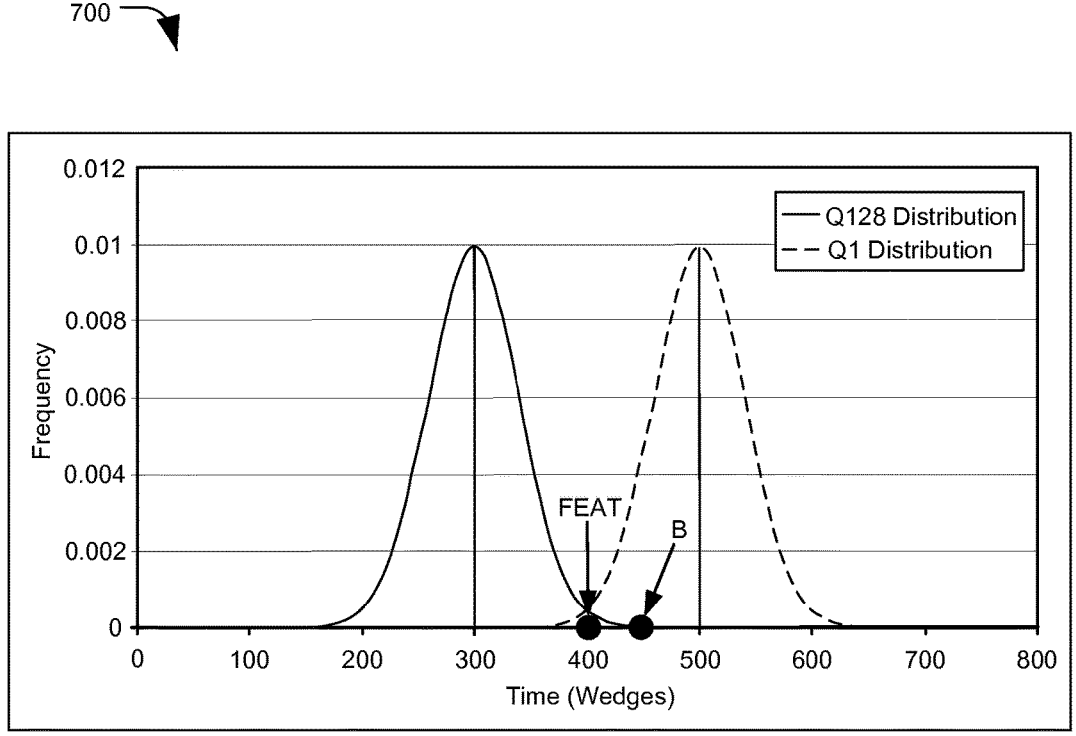
FIG. 7 is a graph 700 of a system employing probabilistic aging command sorting, in accordance with certain embodiments of the present disclosure.

FIG. 7 is a graph 700 of a system employing probabilistic aging command sorting, in accordance with certain embodiments of the present disclosure. Graph 700 depicts another example of a selected command 'B,' according to the calculations discussed above. Once again, the FEAT, as calculate above, is 400 wedges, as shown on graph 700. An initial access time for selected command B, in the queue of 128, may be calculated to be 450 wedges, as shown on graph 700. 450 wedges may be a slow access time relative to the Q128 distribution, and is slower than the FEAT of 400 calculated above. In general, activating command B now would represent a relative negative over re-queuing of −50 wedges. For example, FEAT—base access time, in this case, is 400−450=−50 wedges. From the examples of FIGS. 6 and 7, it can be seen that command timeouts may complicate the reordering process. The probability of a command time out may be incorporated into access time calculations, as described below.

The following values may be estimated or determined for a given device:

| | |
|---|---|
| AverageAccessTimeForWorkload (ATWL) = | Estimated |
| Queue 1 Access Time (Q1AT) = | Estimated |
| IORate = | Estimated |

ATWL may refer to an average I/O rate at a given queue depth in terms of wedges per I/O operation. For example, this may be a representation of an average number of wedges per I/O operation when operating at a queue depth of 128. In some embodiments, a drive may store a number of ATWL values for different workload sizes, it may store a single representative value (e.g. average workload), it may store a "worst case" value for a full queue workload, it may store other values, or any combination thereof. Q1AT may refer to an average I/O rate in terms of wedges per operation for unqueued operations. IORate may refer to an average number of operations per second at a given queue depth. Again, a number of IORates may be stored, one or more representative values may be stored, or any combination thereof.

For example, ATWL, Q1AT, and IORate may be determined by a manufacturer of the device based on a device's components and performance attributes, and stored to the device for accessing. In some embodiments, these values may be determined or measured by a drive or device during operation. Other embodiments are also possible.

The following values may be calculated for each command:

Access Time (AT)=Seek Time+Rotational Latency;

Time Remaining Before Time Out (Time)=Time Out Limit−Age of Command;

Opportunities Remaining In Queue (X)=Time*IORate;

Probability of Time Out (Prob)=(Queue Depth−1)/(Queue Depth)$^x$;

Future Expected Access Time (FEAT)=ATWL+Prob*($Q1AT-ATWL$);

Time Out Adjusted AT (TAAT)=AT−(FEAT−AT);

As may be seen above, the TAAT for a command may be the command's AT (or "base" access time unmodified by a time out probability), modified by the comparison of the time out probability-modified FEAT and the AT. In some embodiments, a device may compare the TAAT of commands within a command queue to determine an order to execute the commands. For example, the TAAT for each command may be calculated, and the command with the lowest TAAT may be selected for execution next. TAAT may be simplified, as follows, TAAT=2AT−ATWL−Prob*($Q1AT-ATWL$);

In some embodiments, ATWL may be a predetermined value (e.g. calculated by a manufacturer), and therefore may be considered a constant for any given workload. Adding a constant to all commands in the queue may not change their order, so it may be removed from the TAAT calculation. Also, since dividing all access times by two may not change a command order, TAAT may be further simplified:

TAAT=AT−Prob*($Q1AT-ATWL$)/2

In some embodiments, a look up table may be used in place of performing some calculations. For example, using a look up table may avoid the need to perform exponent calculations when computing the Probability of Time Out value. In some embodiments, rather than having a look up table for all possible queue depths, a number of look up tables for selected queue depths could be used (e.g. 16, 32, 64, etc.), and a closest approximate queue-depth table could be used for calculations. In some embodiments, look up tables for one or more queue depths could be stored, and index scaling could be employed to account for variations in the actual queue depth.

An example of employing index scaling on a look up table may include:
1. Create lookup table for some base queue depth value ($Q_{base}$). For example, the $Q_{base}$ value may be an average queue depth for the device, a worst-case queue depth, or other queue depths.
2. Scale the index into the table (X) by the scalar $Q_{base}$/Queue Depth. Queue Depth can refer to an actual or current queue depth when performing the calculations.

For example, a lookup table for a selected base queue depth $Q_{base}$ may be populated with values based on the equation:

Probability $(Q_{base})=((Q_{base}-1)/Q_{base})^x$;

for some input value 'X,' with X indicating a number of IO opportunities left before a command times out. Similarly, a lookup table for an actual queue depth 'Q' may be populated with values based on the equation:

Probability $(Q)=((Q-1)/Q)^x$

It can be assumed that 'Probability (Q)' differs from 'Probability (Qbase)' by only a scaling constant 'C' on the exponent 'X':

Probability $(Q)=((Q-1)/Q)^x=((Q_{base}-1)/Q_{base})^{cx}$;

By taking the logarithm of both sides, and solving for 'C,' it can be seen that:

$C=\log((Q-1)/Q)/\log((Q_{base}-1)/Q_{base}))$

The equation may be further simplified by using the linear approximation of: "Log(R)~R−1" for values of R close to 1. This can be a fairly good assumption given that ratio of (Q−1)/Q may be very close to 1 for the probability calculations. This approximation can lead to a simplified equation for 'C':

$C=Q_{base}/Q$

In some examples, using the probability table architecture derived above, the new process steps may include calculating, for each command:

Access Time (AT)=Seek Time+Rotational Latency;

Time Remaining Before Time Out (Time)=Time Out Limit−Age of Command;

Opportunities Remaining In Queue (X)=Time*IORate;

$C*X=X*Q_{base}/Q$;

Probability of Time Out (Prob)=Probability Table $[C*X]$;      [Equation 3]

TAAT=AT−Prob*($Q1AT-ATWL$)/2;      [Equation 4]

assuming the same estimated or calculated values for ATWL, Q1AT, and IORate as described above.

The algorithms and computations provided above are just some examples. Different equations, estimates, variables, and values can be used to calculate a probability of a command timing out and adjust command executions based on the probability. For example, the Timeout Adjusted Activation Time equation provided above may be simplified further by approximating variables. For example, rather than employing multiple probability tables, or using a scaling constant 'C,' a single probability look-up table could be used, for example using a "worst-case" full queue depth and disregarding the actual current queue depth. In some embodiments, ATWL, Q1AT, or both could be constants stored to a device. For example, a single ATWL value for a "worst-case" queue depth may be used.

Using Equation 4 above as an example, if the values for Q1AT and ATWL were constants, and a single probability look up table was employed, the probability look up table could be populated with values taking into account the Q1AT and ATWL values. The calculations for "Prob*(Q1AT−ATWL)/2" could be performed prior to command execution and stored to the device in a table, for example by a manufacturer of the device. For example, the table could store values representing an access time adjustment as a factor of a number of execution opportunities remaining. When simplified as described, the calculations performed for a command to derive an access time modified based on a probability of time out may be reduced to:

| | |
|---|---|
| Access Time (AT) = | SeekTime + Rotational Latency; |
| Time Remaining Before Time Out (Time) = | Time Out Limit − Age of Command; |
| Opportunities Remaining In Queue (X) = | Time * IORate; |
| Probability Term = | Probability Term Table [X]; |
| TAAT = | AT − Probability Term |

Using estimated constants and simplified probabilistic aging algorithms may provide much of the performance benefit while reducing a run-time computational overhead.

Calculating TAAT is based on a statistical algorithm, so scenarios may rarely arise where an I/O operation is selected for a queue position even with a very poor calculated AT. A DSD may be configured to perform additional calculations or logic checks to limit such instances. For example, a DSD may be configured to exclude re-ordering of an operation if the calculated AT is greater than the Q1AT, meaning that the command will take longer to execute than an average command executed at a queue depth of 1. In some embodiments, a command may require an AT that is better than the Q1AT by some selected threshold. Other embodiments are also possible.

FIG. 8 is a flowchart of a method 800 for probabilistic aging command sorting, in accordance with certain embodiments of the present disclosure. Method 800 may include selecting a command from a command queue, at 802. In some embodiments, a device may calculate a time out-adjusted access time for each command in a queue to determine which command to execute next, or determine how to organize the commands. In some embodiments, only commands over a certain age may be selected and their time out probabilities calculated. In some embodiments, time out adjusted access times may be calculated for commands based on an associated priority; e.g. high-priority commands may have time out adjusted access times calculated to avoid time out, while low profile commands may not have time out adjusted access times calculated. Other embodiments are also possible.

Method 800 may include calculating a first estimated access time to execute the selected command, at 804. In some embodiments, calculating the access time may be based on an estimated seek time plus rotational latency for a given head and disc location. For example, the estimated access time may be based on an expected head and disc location on finishing the current command. In some embodiments, the estimated access time may be based on an anticipated head and disc location of after finishing another command in the queue to select a beneficial queue slot for the selected command. Other embodiments are also possible.

At 806, the method 800 may include modifying the first estimated access time based on a probability of the selected command reaching a time out age threshold, in order to determine a time out-adjusted access time. For example, the time out-adjusted access time may be compared against the computed access times of other commands in the queue to determine an execution order. In some embodiments, the more likely a command is to time out, the more the access time may be modified in favor of repositioning the command in the queue for earlier execution.

A determination may be made as to whether there are additional commands in the command queue, at 808. For example, if a time out adjusted access time is calculated for every command in the command queue, the method 800 may include cycling through each pending command to calculate the adjusted access times. In embodiments where only commands meeting a certain criteria (e.g. beyond a specified age threshold or having a certain priority) have a time out adjusted access time calculation, the method 800 may include looking for any remaining commands meeting the criteria, at 808. Other embodiments are also possible. If there are additional commands in the command queue that are to have adjusted access times calculated, at 808, the next such command may be selected for evaluation at 810, and the method may repeat from 804.

If commands remain in the queue to have their adjusted access times calculated, at 808, the method 800 may include executing the commands in the command queue in an order based on their time out-adjusted access times, at 812. For example, the time out-adjusted access time for a selected command may be used to determine whether to execute the selected command next out of the pending commands. In some examples, the time out-adjusted access time may be used to position the selected command in another slot of the command queue, for example based on where the command would cause the least amount of access time delay to execute. Other embodiments are also possible.

FIG. 9 is a flowchart of a method 900 for probabilistic aging command sorting, in accordance with certain embodiments of the present disclosure. Method 900 may include selecting a command from a command queue, at 902. In some embodiments, a device may calculate a timeout adjust access time for each command in a queue to determine which command to execute next. In some embodiments, only commands over a certain age may be selected and their time out probabilities calculated. Other embodiments are also possible.

Method 900 may include calculating a probability of the command timing out, at 904. For example, this may include performing an equation such as (Queue Depth−1)/(Queue Depth)$^x$, where X designates an estimated number of I/O opportunities remaining before the command times out. In other embodiments, calculating a probability of timeout may include retrieving a value from a look up table. Other embodiments are also possible.

Method 900 may include calculating a probability-adjusted estimated access time, at 906, based on the probability of timing out calculated in 904. For example, this may be calculated as the future expected access time (FEAT) described above, by multiplying the probability of timing out against a difference between an unqueued IO rate and an IO rate for a selected queue depth, added to the IO rate for the selected queue depth. In some embodiments, the probability-adjusted estimated access time may be stored in a look up table. Other embodiments are also possible.

Method 900 may include calculating a base estimated access time to perform the command at a selected point, at 908. In some embodiments, calculating the access time may be based on an estimated seek time plus rotational latency for a given head and disc location. For example, the selected point may be immediately following the currently executing command, based on an expected head and disc location on finishing the current command. In some embodiments, the selected point may be at another location in the command queue, based on an anticipated head and disc location of the preceding command in the queue. Other embodiments are also possible.

At 910, the method 900 may include determining whether executing the selected command at the selected point from 908 may result in a positive time adjustment, by comparing the base estimated access time to the probability adjusted access time. For example, if the probability adjusted access time is 450 wedges, and the base access time is 300 wedges, executing the selected command at the selected point may result in a net performance gain, and the time adjustment may be positive. If the probability adjusted access time is 450 wedges, and the base access time is 500 wedges, the time adjustment may be negative, resulting in an overall performance loss.

If the time adjustment is positive, at 912, the method 900 may include placing the command into the command queue at the selected point. In some embodiments, the selected point may be the next command for execution, and the selected command may be put at the front of the queue. If the time adjustment is not positive, at 912, the method 900 may include not adjusting the commands position in the command queue, at 916.

In some embodiments, the method 900 may select a command and compare the probability-adjusted access time against the next available execution slot. If executing the command at the next execution slot does not result in a positive time adjustment, at 916, the method 900 may include selecting the next highest slot in the command queue, at 918, and calculating a base access time for that slot, at 908.

FIG. 10 is a flowchart of a method 1000 for probabilistic aging command sorting, in accordance with certain embodiments of the present disclosure. Method 1000 may include selecting an operation from a command queue, at 1002. The method 1000 may include calculating a baseline access time for the operation, at 1004.

At 1006, the method may include calculating a time remaining until time out for the operation. For example, if the operation had a time limit of 2 seconds, and it remains in the command queue after 1.5 seconds, the operation may have 0.5 seconds remaining until time out.

The method 1000 may include multiplying the time remaining by an input/output (I/O) rate of the storage device to determine a time factor, at 1008. For example, the I/O rate may be an estimated number of I/O operations the storage device may perform per second at a given queue depth. For example, if there are currently 32 operations in the command queue, the storage device may perform an average of 400 I/O operations per second. In some embodiments, the method 1000 may include using an IO rate estimate based on a pre-determined queue depth, regardless of the current queue depth. Other embodiments are also possible. When the I/O rate is multiplied by an amount of time remaining, the resulting time factor may be a number of I/O opportunities remaining before the selected operation reaches the time out threshold.

Method 1000 may include retrieving a probability-adjusted access time value from a table based on the time factor, at 1010. For example, if the time factor determined at 1008 indicates there are 300 I/O opportunities remaining before timing out, this value may be used to look up a probability-adjusted access time value from a look up table. The probability-adjusted access time value may be a weighted value based on a probability of the operation timing out and estimated access times if the time out threshold is reached.

Method 1000 may include subtracting the probability-adjusted access time value from the baseline access time value to determine a time out-adjusted access time, at 1012. For example, this may result in an access time that is weighted towards earlier execution the closer the operation is to reaching the time out threshold. At 1010, the method may include positioning the operation in the command queue based on the time out-adjusted access time. This may include performing the selected operation as the next operation, or it may include inserting it into the queue at another position according to an ordering of commands based on time out-adjusted access time for the commands.

The methods, algorithms, devices, and processes described above for probabilistic aging command sorting can be applied using a variety of command sorting and executing techniques. For example, a data storage device using a shortest-access-time-first (SATF) approach, sometimes called a rotational positional sorting (RPS) algorithm, may use the probabilistic aging command sorting to select the order to execute commands. An SATF approach may calculate a timeout adjusted access time (TAAT) for one or more commands in a queue to determine which command to execute next. This process may be repeated during each operation to select the next operation based on a shortest access time. As commands come closer to their time out thresholds, their TAAT values may become lower, increasing the probability that the selected command will be executed next even if the selected command would not be the fastest to execute in practice.

In some embodiments, the probabilistic aging command sorting may be used with a traveling salesman-type algorithm, which may determine a shortest access time for a set of N commands, instead of on a command-by-command basis. For example, N may be every command in the command queue, a selected number of commands, or a subset of the commands less than all of the commands. A set of N commands less than all of the commands may be selected based on the ages of the commands, based on storage medium localities accessed by the commands, transfer lengths of the commands, other factors, or any combination thereof. In some embodiments, a device may calculate the TAAT for commands in the command queue, the future expected access time (FEAT), other values, or any combination thereof, and the N commands may be selected based on the computed values. Once selected, the N commands may be ordered based on calculating probabilistic aging-adjusted access times. Other embodiments are also possible.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit configured to:
   determine a first access time to execute a selected command from a command queue;
   determine a numerical value representing a probability of the selected command reaching a time-out threshold, the time-out threshold representing a period within which the selected command must be executed to avoid failure of the selected command;
   calculate an adjusted access time by modifying the first access time based on a mathematical calculation including the first access time and the numerical value representing the probability; and
execute the selected command based on the adjusted access time.

2. The apparatus of claim 1 comprising the circuit further configured to:
determine the first access time as a time to execute the selected command if the selected command is placed at a selected slot in the command queue;
determine a second access time for the selected command based on the probability;
determine a time adjustment by comparing the first access time and the second access time; and
place the selected command in the selected slot if the time adjustment indicates a net performance gain at the first access time compared to the second access time.

3. The apparatus of claim 2 comprising the circuit configured to:
determine the second access time further based on a first input/output (TO) rate of accessing a data storage medium.

4. The apparatus of claim 3 comprising:
the circuit configured to determine the second access time further based on a second IO rate;
the first IO rate based on an estimated time to access the data storage medium when a specified number of commands are in the command queue; and
the second IO rate based on an estimated time to access the data storage medium when no commands are in the command queue.

5. The apparatus of claim 1 comprising:
the circuit configured to determine the probability of the selected command reaching the time-out threshold, including:
multiplying a first IO rate of accessing a data storage medium by a time remaining before the selected command reaches the time-out threshold to determine a number of execution opportunities remaining; and
looking up the probability in a table based on the number of execution opportunities remaining.

6. The apparatus of claim 5 further comprising:
the table includes values representing odds of a command being executed before the time-out threshold multiplied by a difference between an IO rate for unqueued commands and an IO rate for queued commands.

7. The apparatus of claim 1 comprising the circuit configured to:
determine the first access time based on a seek time and rotational latency to move a transducer head from an origin point of a data storage medium to a destination point for the selected command.

8. The apparatus of claim 1 further comprising:
the time-out threshold includes a time limit designated by a command interface between the apparatus and a host device, the time limit indicating an amount of time in which a command is to be executed.

9. The apparatus of claim 1 comprising the circuit further configured to:
determine the time-out threshold based on a priority value associated with the selected command.

10. A method comprising:
selecting a command from a queue of a storage device for execution, including:
determining a first access time to execute a selected command from the queue;
calculating a value representing a probability of the selected command reaching a time-out threshold, the time-out threshold representing a period within which the selected command must be executed to avoid failure of the selected command;
calculating an adjusted access time by modifying the first access time based on a calculation including the first access time and the value representing the probability; and
executing the selected command based on the adjusted access time.

11. The method of claim 10 further comprising:
determining the first access time as a time to execute the selected command if the selected command is placed at a selected slot in the queue;
determining a second access time for the selected command based on the probability and a first input/output (TO) rate of accessing a data storage medium;
determining a time adjustment by comparing the first access time and the second access time; and
placing the selected command in the selected slot if the time adjustment indicates a net performance gain at the first access time compared to the second access time.

12. The method of claim 11 further comprising:
determining the second access time further based on a second TO rate;
the first TO rate is based on an estimated time to access the data storage medium when a specified number of commands are in the queue; and
the second TO rate is based on an estimated time to access the data storage medium when no commands are in the queue.

13. The method of claim 10 further comprising:
calculating the value representing the probability of the selected command reaching a time-out threshold, including:
multiplying a first TO rate of accessing a data storage medium by a time remaining before the selected command reaches the time-out threshold to determine a number of execution opportunities remaining; and
looking up the value in a table based on the number of execution opportunities remaining.

14. The method of claim 10 further comprising:
determining the first access time based on a seek time and rotational latency to move a transducer head from an origin point of a data storage medium to a destination point for the selected command.

15. The method of claim 10 further comprising:
the time-out threshold includes a time limit designated by a command interface between the storage device and a host device, the time limit indicating an amount of time in which a command is to be executed.

16. An apparatus comprising:
a processor configured to sort commands for execution in an order weighted according to a probability that each command will time out before being executed, including:
determine a value representing a probability of a command reaching a time limit for executing the command;
calculate a probability-adjusted access time for the command based on a mathematical calculation including an attribute of the command and the value representing the probability; and
execute the command based on the probability-adjusted access time.

17. The apparatus of claim 16 further comprising:
the attribute of the command includes a first access time to execute the command at a selected slot in a command queue;
the processor further configured to:
  determine a second access time for the command based on the probability and a first input/output (TO) rate of accessing a data storage medium;
  calculate a time adjustment by comparing the attribute and the second access time; and
  place the command in the selected slot if the time adjustment indicates a net performance gain at the first access time compared to the second access time.

18. The apparatus of claim 17 comprising:
the processor configured to determine the second access time further based on a second TO rate;
the first TO rate is based on a time to access the data storage medium when a specified number of commands are in the command queue; and
the second TO rate is based on a time to access the data storage medium when no commands are in the command queue.

19. The apparatus of claim 16 comprising:
the processor configured to determine the probability-adjusted access time, including:
  multiplying a first TO rate of accessing a data storage medium by a time remaining before the command reaches the time limit to determine a number of execution opportunities remaining;
  looking up the probability in a table based on the number of execution opportunities remaining; and
  modifying the attribute based on the probability to obtain the probability-adjusted access time.

20. The apparatus of claim 16 further comprising:
the attribute includes a priority value associated with the command influencing the execution order of the command relative to other pending commands.

21. The apparatus of claim 16 comprising the processor further configured to:
  calculate probability-adjusted access times for a plurality of commands in a command queue including the command; and
  select a command for execution from the plurality of commands based on the probability-adjusted access times.

22. The apparatus of claim 21 comprising the processor further configured to:
  select an execution order for the plurality of commands based on the probability-adjusted access times.

23. The apparatus of claim 21 comprising the processor further configured to:
  select the plurality of commands to include a predetermined number of commands, or all of the commands from the command queue if all of the commands are less than the predetermined number; and
  select an execution order for the plurality of commands based on the probability-adjusted access times.

24. The apparatus of claim 23 comprising the processor further configured to:
  select the execution order by computing a shortest access time to execute each command of the plurality of commands based on the probability-adjusted access times.

* * * * *